Oct. 11, 1932.  E. L. LOREHN  1,882,223
METALLIC PACKING
Filed Nov. 5, 1929

Edmond L. Lorehn, INVENTOR.
BY Jesse R. Stone
ATTORNEYS.

Patented Oct. 11, 1932

1,882,223

UNITED STATES PATENT OFFICE

EDMOND L. LOREHN, OF HOUSTON, TEXAS

METALLIC PACKING

Application filed November 5, 1929. Serial No. 405,007.

My invention relates to packing to be employed where heavy pressures are encountered. It is adapted for use under heat or under ordinary temperatures without material deterioration.

It is an object of the invention to provide a wear-resisting packing which will be capable of maintaining a tight seal between movable parts under high pressures and temperatures.

I also desire to so form the packing that the fluid pressure will assist in maintaining a close contact between the packing and the adjacent parts and will last for long periods without replacement.

Figure 1:
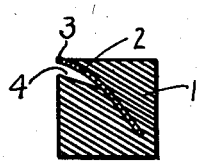

Referring to the drawing herewith wherein a preferred embodiment of the invention is disclosed, Fig. 1 is a transverse section through a strip of packing embodying my invention.

Figure 2:
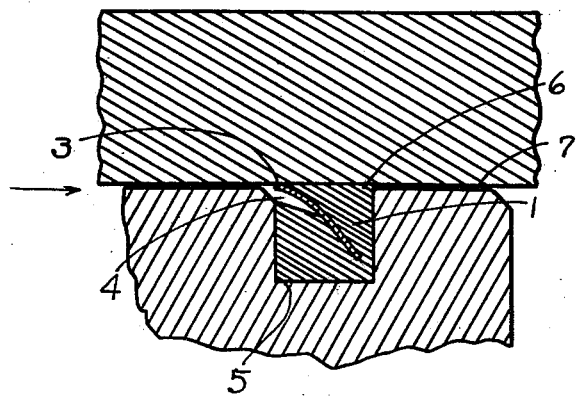

Fig. 2 is a broken section illustrating the appearance of the packing in operative position, the packing being shown in transverse section.

It is to be understood that my packing is adapted for use between parts where a fluid seal is to be obtained and in which one of the parts at least may be movable relative to the other. It is particularly adapted for use about moving shafts or plungers where heavy pressures are encountered, such as in pistons, rams or valves. The packing may be made in longitudinal strips, as the ordinary packing for this purpose is made, or it may be made in rings or any other preferred form.

The packing is preferably rectangular in cross section as shown at 1 in the drawing. The body of the packing is preferably of metal such as lead or babbit, or some similar metal which is capable of being bent and wedged into a seat in the stuffing box or in the moving part itself, if desired. I contemplate placing within the metallic packing strip or ring a sheet of hard metal indicated at 2 and this metallic sheet may be of copper or other metal which is not too hard but which may be bent to conform to the place in which the packing is positioned. This strip 2 of harder metal is placed longitudinally of a packing strip and preferably at an angle relative to the sides thereof as shown in the drawing. Thus one side of the strip 2 is imbedded in the body of the packing strip and is inclined so as to project slightly at one corner of the packing. It may have a lip 3 which extends slightly beyond the side of the main body and this is intended to bear against the adjacent parts with which the seal is to be made and be slightly depressed so as to hold resiliently against the adjacent wall.

On the inner side of the lip 3, I may recess the body of the packing strip 1, as shown at 4, and it is intended that the packing shall be so arranged that the recess 4 will be presented in the direction of the fluid pressure so that the pressure entering the recess 4 will act to force the lip 3 against the adjacent wall.

With reference particularly to Fig. 2, I contemplate placing my packing strip 1 in a recess 5 into which the packing fits tightly. The outer side of the packing when thus in position projects slightly beyond the wall of the recess 5, as shown at 6, and will thus bear against the adjacent wall 7 and maintain a tight contact therewith. Any pressure fluid coming in the direction of the arrow in Fig. 2, and escaping between the adjacent walls will enter the recess 4 and tend to increase the pressure on the lip 3 and thus maintain a seal at that point.

I thus have the fluid pressure assisting in the maintenance of the seal between the adjacent parts and the resiliency of the metal in the strip 2 will also tend to hold the same against the adjacent part. The comparatively soft metal in the body 1 of the packing will tend to maintain the seal, but with the slightly harder metal in the strip 2 a longer wear upon the contacting lip 3 will be possible and the better formation of the lip itself is thus provided.

While I have mentioned lead or babbit as being preferred metals because of their particular consistency, I wish it understood that any similar metal may be employed and that copper or any other similar strip may be employed in connection with the softer metal of the body of the packer.

Having thus described my invention, what I claim as new and desire to protect by Letters Patent is:

1. A packing including an elongated body of metal shaped to lie within a groove in a metallic wall and to project slightly therefrom against an adjacent member, and a single strip of relatively harder metal imbedded in said body having a lip thereon presented in the direction of the fluid pressure.

2. A packing including an elongated body of metal shaped to lie within a groove in a metallic wall and to project slightly therefrom against an adjacent member, and a single strip of relatively harder metal in said body having a lip thereon presented in the direction of the fluid pressure, said body being recessed adjacent said lip for the purpose described.

3. A packing including an elongated body of metal shaped to lie within a groove in a metallic wall and to project slightly therefrom against an adjacent member, and a single strip of relatively harder metal imbedded in said body having a lip thereon presented in the direction of the fluid pressure, the rearward side of said strip being supported by said body, said lip being adapted to resiliently engage the adjacent wall surface and to be held in that position by fluid pressure.

4. A packing strip rectangular in cross section made of soft bearing metal, a narrow sheet of relatively harder metal embedded therein diagonally of said strip to project therefrom at one corner, there being a grooved recess at one side of said sheet to receive pressure fluid.

5. A packing strip of lead alloy rectangular in cross section, a narrow sheet of relatively harder metal embedded therein and a lip thereon presented in the direction of the pressure fluid said strip being recessed on the pressure side of said lip.

6. A packing material comprising a body of soft metal approximately rectangular in cross section and having an inwardly tapered groove in one corner, and a strip of relatively hard metal imbedded within said soft metal diagonally thereof to project into said groove and be presented in the direction to receive the fluid pressure.

7. A packing body shaped to fit within a grooved recess, a narrow strip of relatively harder material imbedded therein diagonally of said recess, and extending therefrom in a position inclined toward the direction of fluid pressure, said body being recessed on the forward side of said strip, the rearward side of said strip bearing against said body, whereby said pressure may force said strip outwardly against the adjacent wall.

In testimony whereof I hereunto affix my signature this 9 day of October, A. D. 1929.

EDMOND L. LOREHN.